US012738734B2

(12) United States Patent
Chiu et al.

(10) Patent No.: US 12,738,734 B2
(45) Date of Patent: Sep. 15, 2026

(54) CURRENT-BALANCING POWER SUPPLYING DEVICE

(71) Applicants: MEAN WELL (Guangzhou) Electronics Co., Ltd., Guangzhou (CN); MEAN WELL Enterprises Co., Ltd., New Taipei City (TW)

(72) Inventors: Chih-Hsiang Chiu, New Taipei City (TW); Hao-Yuan Lin, New Taipei City (TW); Min-Qiang Hu, Guangzhou (CN)

(73) Assignees: MEAN WELL (GuangZhou) Electronics Co., Ltd., Guangzhou (CN); MEAN WELL Enterprises Co., Ltd., New Taipei City (TW)

( * ) Notice: Subject to any disclaimer, the term of this patent is extended or adjusted under 35 U.S.C. 154(b) by 0 days.

(21) Appl. No.: 19/024,953

(22) Filed: Jan. 16, 2025

(65) Prior Publication Data

US 2026/0106454 A1 Apr. 16, 2026

(30) Foreign Application Priority Data

Oct. 11, 2024 (CN) ........................ 202411419033.X

(51) Int. Cl.
*H02M 1/00* (2007.01)
*G05F 1/565* (2006.01)
(Continued)

(52) U.S. Cl.
CPC .............. *H02J 1/106* (2020.01); *H02J 1/102* (2013.01)

(58) Field of Classification Search
CPC .......... G05F 1/563; G05F 1/565; G05F 1/575; G05F 1/59; H02J 1/102; H02J 1/106;
(Continued)

(56) References Cited

U.S. PATENT DOCUMENTS 9,748,830 B1 * 8/2017 Soleño .................... H02J 1/102
10,200,050 B1 * 2/2019 Ren ........................... G05F 3/04
(Continued)

FOREIGN PATENT DOCUMENTS

CN 107885269 A 4/2018
TW 201120606 A1 6/2011
TW M463938 U 10/2013

*Primary Examiner* — Elim Ortiz
(74) *Attorney, Agent, or Firm* — Birch, Stewart, Kolasch & Birch, LLP

(57) ABSTRACT

A current-balancing power supplying device includes a master power supply and a slave power supply coupled thereto. The master power supply and the slave power supply are coupled to a load. The master power supply provides a master output current for the load, retrieves the master output current, and generates a master feedback current based on the master output current. The slave power supply receives the master feedback current, provides a slave output current equal to the master output current for the load based on the master feedback current, retrieves the slave output current, generates a slave feedback current and a slave analog current based on the slave output current, adds the master feedback current to the slave feedback current to generate a control current, and stabilizes the slave output current based on the control current and the slave analog current.

8 Claims, 3 Drawing Sheets

(51) Int. Cl.
*G05F 1/575* (2006.01)
*G05F 1/59* (2006.01)
*H02J 1/10* (2006.01)
*H02J 1/102* (2026.01)

(58) Field of Classification Search
CPC ............. H02M 1/0009; H02M 1/0022; H02M 3/1584; H02M 3/33576
USPC .............................. 323/266, 272; 363/17, 65
See application file for complete search history.

(56) References Cited

U.S. PATENT DOCUMENTS 10,511,226 B1 * 12/2019 Gurlahosur ......... H02M 3/1582
2019/0384337 A1 * 12/2019 Lu ........................... G05F 1/575

* cited by examiner

104

CURRENT-BALANCING POWER SUPPLYING DEVICE

BACKGROUND OF THE INVENTION

This application claims priority for the CN patent application no. 202411419033X filed on 11 Oct. 2024, the content of which is incorporated by reference in its entirety.

FIELD OF THE INVENTION

The present invention relates to a supplying device, particularly to a current-balancing power supplying device.

DESCRIPTION OF THE RELATED ART

The parallel-type power supply device uses digital communication technology and employs a master power supply and a slave power supply connected in parallel with each other. The master power supply and the slave power supply communicate with each other. After the slave power supply receives the current signal from the master power supply, the master current generated by the master power supply is compared with the slave current generated by the slave power supply. The digital controller adjusts the master current and the slave current and finally achieves parallel current-balancing purposes.

In addition to parallel communication, the digital controller must perform other functional operations and cannot perform updating functions immediately. Therefore, the parallel communication function is limited by bandwidth and the response speed is slow. In addition, because digital controllers rely on digital communication, they have high requirements for digital resolution, especially models with wide-range output. When outputting high voltage, the digital controller is prone to insufficient resolution, resulting in unstable parallel current-balancing phenomena. Taking a 380-volt (V) model as an example, the output voltage has a range of 167~400V (i.e., the firmware setting value is 160~408V). The number of bits available for the digital controller is 12, which means that the minimum adjustable voltage scale is 0.06V. When the power supplies are connected in parallel, it is assumed that the initial voltage is 380V. For current balance, the target voltage needs to be adjusted to 380.1V. At this time, due to insufficient resolution, the controller will correct back and forth between 380.06V and 380.12V, resulting in voltage and current instability. If a higher-order digital controller is used and the number of available bits is increased, this problem can be solved, but the cost will inevitably increase a lot. However, when the adjustable range of the output voltage is larger (800V or higher-volt models), this problem will be faced again.

To overcome the abovementioned problems, the present invention provides a current-balancing power supplying device, so as to solve the afore-mentioned problems of the prior art.

SUMMARY OF THE INVENTION

The present invention provides a current-balancing power supplying device, which overcomes the problem with limited resolution and improves response speed to achieve balancing current and stable output.

In an embodiment of the present invention, a current-balancing power supplying device includes a master power supply and a slave power supply. The master power supply is coupled to the load and configured to provide a master output current for the load, retrieve the master output current, and generate a master feedback current based on the master output current. The slave power supply is coupled to the master power supply and the load and configured to receive the master feedback current, provide a slave output current equal to the master output current for the load based on the master feedback current, retrieve the slave output current, generate a slave feedback current and a slave analog current based on the slave output current, add the master feedback current to the slave feedback current to generate a control current, and stabilize the slave output current based on the control current and the slave analog current.

In an embodiment of the present invention, the master power supply is configured to provide a master output voltage corresponding to the master output current for the load. The slave power supply is configured to provide a slave output voltage equal to the master output voltage for the load based on the master feedback current.

In an embodiment of the present invention, the master power supply includes a master power supplying circuit, a master current feedback circuit, a master voltage feedback circuit, a master current-balancing controller, a master voltage difference amplifying circuit, and a master comparator. The master power supplying circuit is coupled to the load and configured to receive a master driving voltage and generate the master output current and the master output voltage based on the master driving voltage. The master current feedback circuit is coupled to the load and the master power supplying circuit and configured to retrieve the master output current and generate the master feedback current and a master analog current based on the master output current. The master voltage feedback circuit is coupled to the master power supplying circuit and the load and configured to retrieve the master output voltage and generate a master feedback voltage based on the master output voltage. The master current-balancing controller is coupled to the master current feedback circuit and the slave power supply and configured to receive the master feedback current, generate a master digital setting voltage based on the master feedback current, and output the master feedback current. The master voltage difference amplifying circuit is coupled to the master current feedback circuit and the master current-balancing controller and configured to receive the master analog current and the master digital setting voltage and generate a master analog reference voltage based on the master analog current and the master digital setting voltage. The master comparator is coupled to the master voltage difference amplifying circuit, the master voltage feedback circuit, and the master power supplying circuit and configured to receive the master analog reference voltage and the master feedback voltage and generate the master driving voltage based on the master analog reference voltage and the master feedback voltage.

In an embodiment of the present invention, the master power supplying circuit is a phase-shift full bridge (PSFB) circuit or an inductor-inductor-capacitor (LLC) converter.

In an embodiment of the present invention, the master current-balancing controller includes a master control circuit and a master proportional-integral controller. The master control circuit is coupled to the master current feedback circuit and the slave power supply and configured to transmit the master feedback current to the slave power supply. The master proportional-integral controller is coupled to the master control circuit and the master voltage difference amplifying circuit and configured to receive the master feedback current through the master control circuit and generate the master digital setting voltage based on the master feedback current.

In an embodiment of the present invention, the master voltage difference amplifying circuit includes a master voltage-dividing circuit, a master operational amplifier, a master feedback resistor, and a master output resistor. The master voltage-dividing circuit is coupled to the master current feedback circuit and the master proportional-integral controller. The positive input and the negative input of the master operational amplifier are coupled to the master voltage-dividing circuit. The master feedback resistor is coupled between the negative input and the output of the master operational amplifier. The master output resistor is coupled between the output of the master operational amplifier and the master comparator. The master operational amplifier is configured to receive the master analog current and the master digital setting voltage through the master voltage-dividing circuit and generate the master analog reference voltage through the master output resistor based on the master analog current and the master digital setting voltage.

In an embodiment of the present invention, the slave power supply includes a slave power supplying circuit, a slave current feedback circuit, a slave voltage feedback circuit, a slave current-balancing controller, a slave voltage difference amplifying circuit, and a slave comparator. The slave power supplying circuit is coupled to the load and configured to receive a slave driving voltage and generate the slave output current and the slave output voltage based on the slave driving voltage. The slave current feedback circuit is coupled to the load and the slave power supplying circuit and configured to retrieve the slave output current and generate the slave feedback current and a slave analog current based on the slave output current. The slave voltage feedback circuit is coupled to the slave power supplying circuit and the load and configured to retrieve the slave output voltage and generate a slave feedback voltage based on the slave output voltage. The slave current-balancing controller is coupled to the slave current feedback circuit and the master power supply and configured to receive the master feedback current and the slave feedback current, add the master feedback current to the slave feedback current to generate the control current, and generate a slave digital setting voltage based on the control current. The slave voltage difference amplifying circuit is coupled to the slave current feedback circuit and the slave current-balancing controller and configured to receive the slave analog current and the slave digital setting voltage and generate a slave analog reference voltage based on the slave analog current and the slave digital setting voltage. The slave comparator is coupled to the slave voltage difference amplifying circuit, the slave voltage feedback circuit, and the slave power supplying circuit and configured to receive the slave analog reference voltage and the slave feedback voltage and generate the slave driving voltage based on the slave analog reference voltage and the slave feedback voltage.

In an embodiment of the present invention, the slave power supplying circuit is a phase-shift full bridge (PSFB) circuit or an inductor-inductor-capacitor (LLC) converter.

In an embodiment of the present invention, the slave current-balancing controller includes a slave control circuit and a slave proportional-integral controller. The slave control circuit is coupled to the slave current feedback circuit and the master power supply and configured to receive the master feedback current and the slave feedback current and add the master feedback current to the slave feedback current to generate the control current. The slave proportional-integral controller is coupled to the slave control circuit and the slave voltage difference amplifying circuit and configured to receive the control current and generate the slave digital setting voltage based on the control current.

In an embodiment of the present invention, the slave voltage difference amplifying circuit includes a slave voltage-dividing circuit, a slave operational amplifier, a slave feedback resistor, and a slave output resistor. The slave voltage-dividing circuit is coupled to the slave current feedback circuit and the slave proportional-integral controller. The positive input and the negative input of the slave operational amplifier are coupled to the slave voltage-dividing circuit. The slave feedback resistor is coupled between the negative input and the output of the slave operational amplifier. The slave output resistor is coupled between the output of the slave operational amplifier and the slave comparator. The slave operational amplifier is configured to receive the slave analog current and the slave digital setting voltage through the slave voltage-dividing circuit and generate the slave analog reference voltage through the slave output resistor based on the slave analog current and the slave digital setting voltage.

To sum up, the current-balancing power supplying device uses an analog current to overcome the problem with limited resolution and improve response speed to achieve balancing current and stable output.

DETAILED DESCRIPTION OF THE INVENTION

Figure 1:
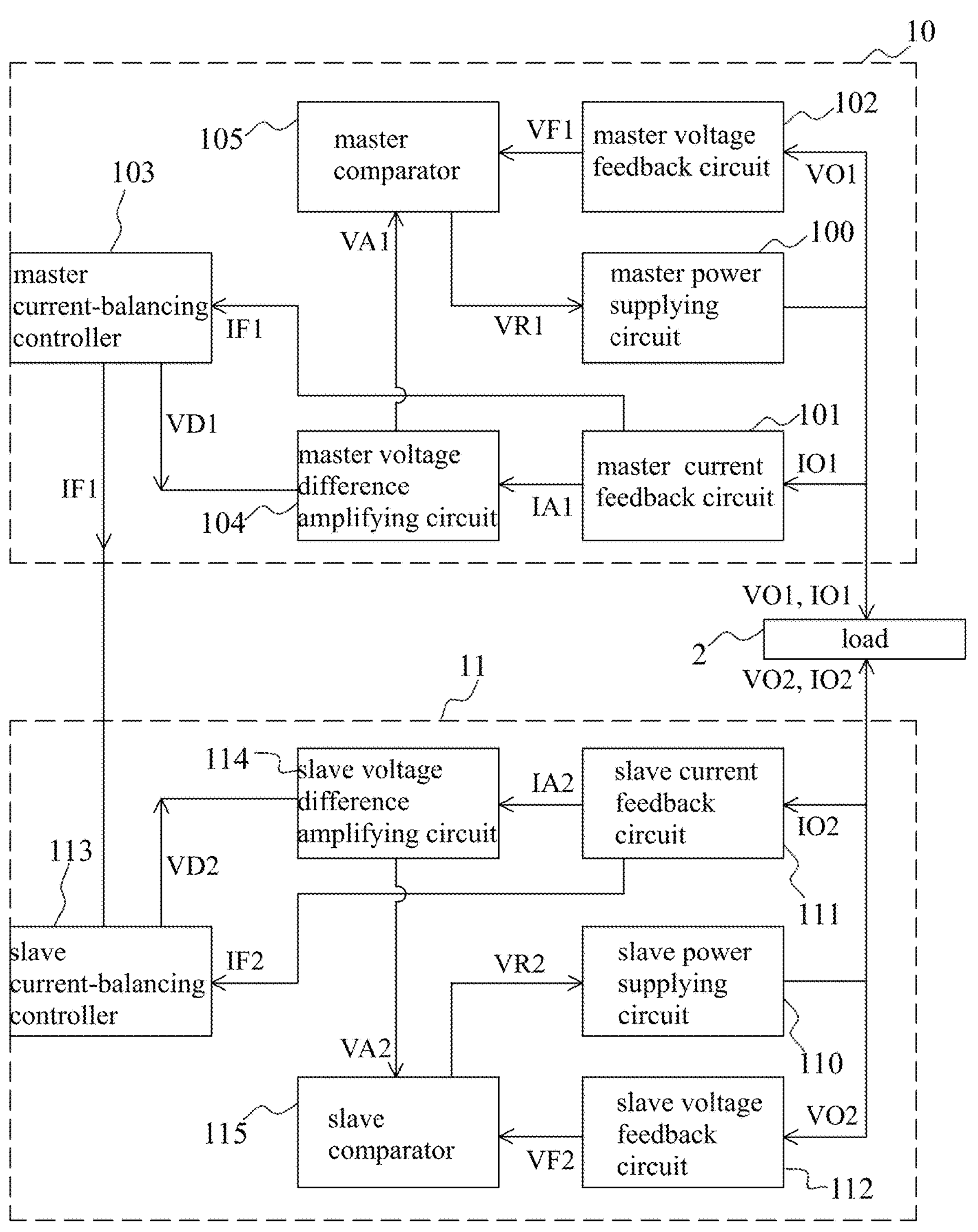
FIG. 1 is a diagram schematically illustrating a current-balancing power supplying device according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as “can”, “could”, “might”, or “may”, usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following description, a current-balancing power supplying device will be provided. The current-balancing power supplying device uses an analog current to overcome the problem with limited resolution and improve response speed to achieve balancing current and stable output.

FIG. 1 is a diagram schematically illustrating a current-balancing power supplying device according to an embodiment of the present invention. Referring to FIG. 1, a current-balancing power supplying device 1 is introduced as follows. The current-balancing power supplying device 1 is coupled to a load 2. The current-balancing power supplying device 1 includes a master power supply 10 and a slave power supply 11. The master power supply 10 is coupled to the load 2. The slave power supply 11 is coupled to the master power supply 10 and the load 2. The master power supply 10 provides a master output current IO1 and a master output voltage VO1 corresponding to the master output current IO1 for the load 2, retrieves the master output current IO1, and generates a master feedback current IF1 based on the master output current IO1. The slave power supply 11 receives the master feedback current IF1, provides a slave output current IO2 equal to the master output current IO1 and a slave output voltage VO2 equal to the master output voltage VO1 for the load 2 based on the master feedback current IF1, retrieves the slave output current IO2, generates a slave feedback current IF2 and a slave analog current IA2 based on the slave output current IO2, adds the master feedback current IF1 to the slave feedback current IF2 to generate a control current, and stabilizes the slave output current IO2 and the slave output voltage VO2 based on the control current and the slave analog current IA2. The slave analog current IA2 can overcome the problem with limited resolution and improve response speed to achieve balancing current and stable output.

In some embodiments of the present invention, the master power supply 10 may include, but is not limited to, a master power supplying circuit 100, a master current feedback circuit 101, a master voltage feedback circuit 102, a master current-balancing controller 103, a master voltage difference amplifying circuit 104, and a master comparator 105. The master power supplying circuit 100 may be, but not limited to, a phase-shift full bridge (PSFB) circuit or an inductor-inductor-capacitor (LLC) converter. The master power supplying circuit 100 is coupled to the load 2. The master current feedback circuit 101 is coupled to the load 2 and the master power supplying circuit 100. The master voltage feedback circuit 102 is coupled to the master power supplying circuit 100 and the load 2. The master current-balancing controller 103 is coupled to the master current feedback circuit 101 and the slave power supply 11. The master voltage difference amplifying circuit 104 is coupled to the master current feedback circuit 101 and the master current-balancing controller 103. The master comparator 105 is coupled to the master voltage difference amplifying circuit 104, the master voltage feedback circuit 102, and the master power supplying circuit 100. The master power supplying circuit 100 receives a master driving voltage VR1 and generates the master output current IO1 and the master output voltage VO1 based on the master driving voltage VR1. The master current feedback circuit 101 retrieves the master output current IO1 and generates the master feedback current IF1 and a master analog current IA1 based on the master output current IO1. The master voltage feedback circuit 102 retrieves the master output voltage VO1 and generates a master feedback voltage VF1 based on the master output voltage VOL. The master current-balancing controller 103 receives the master feedback current IF1, generates a master digital setting voltage VD1 based on the master feedback current IF1, and outputs the master feedback current IF1. The master voltage difference amplifying circuit 104 receives the master analog current IA1 and the master digital setting voltage VD1 and generates a master analog reference voltage VA1 based on the master analog current IA1 and the master digital setting voltage VD1. The master digital setting voltage VD1 has resolution-related limitations, and the master analog current IA1 can be used to overcome these limitations, so that the master analog reference voltage VA1 does not have resolution-related limitations. The master comparator 105 receives the master analog reference voltage VA1 and the master feedback voltage VF1 and generates the master driving voltage VR1 based on the master analog reference voltage VA1 and the master feedback voltage VF1.

Figure 2:
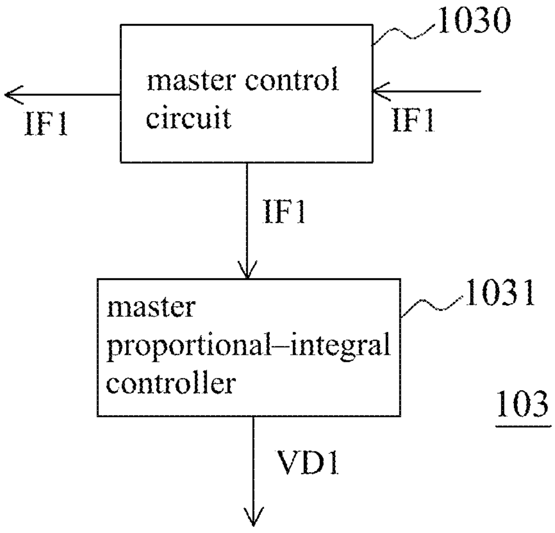
FIG. 2 is a diagram schematically illustrating a master current-balancing controller according to an embodiment of the present invention.
Figure 3:
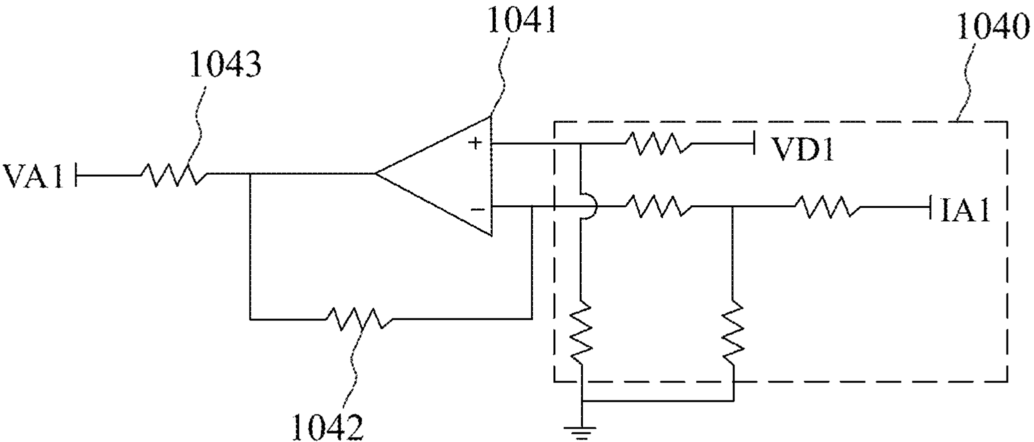
FIG. 3 is a diagram schematically illustrating a master voltage difference amplifying circuit according to an embodiment of the present invention.

FIG. 2 is a diagram schematically illustrating a master current-balancing controller according to an embodiment of the present invention. Referring to FIG. 1 and FIG. 2, the master current-balancing controller 103 may include, but is not limited to, a master control circuit 1030 and a master proportional-integral controller 1031. The master control circuit 1030 is coupled to the master current feedback circuit 101 and the slave power supply 11. The master proportional-integral controller 1031 is coupled to the master control circuit 1030 and the master voltage difference amplifying circuit 104. The master control circuit 1030 transmits the master feedback current IF1 to the slave power supply 11. The master proportional-integral controller 1031 receives the master feedback current IF1 through the master control circuit 1030 and generates the master digital setting voltage VD1 based on the master feedback current IF1. FIG. 3 is a diagram schematically illustrating a master voltage difference amplifying circuit according to an embodiment of the present invention. Referring to FIG. 1, FIG. 2, and FIG. 3, the master voltage difference amplifying circuit 104 may include, but is not limited to, a master voltage-dividing circuit 1040, a master operational amplifier 1041, a master feedback resistor 1042, and a master output resistor 1043. The master voltage-dividing circuit 1040 is coupled to the master current feedback circuit 101 and the master proportional-integral controller 1031. The positive input and the negative input of the master operational amplifier 1041 coupled to the master voltage-dividing circuit 1040. The master feedback resistor 1042 is coupled between the negative input and the output of the master operational amplifier 1041. The master output resistor 1043 is coupled between the output of the master operational amplifier 1041 and the master comparator 105. The master operational amplifier 1041 receives the master analog current IA1 and the master digital setting voltage VD1 through the master voltage-dividing circuit 10 40 and generates the master analog reference voltage VA1 through the master output resistor 1043 based on the master analog current IA1 and the master digital setting voltage VD1.

Please refer to FIG. 1 In some embodiments of the present invention, the slave power supply 11 may include, but is not limited to, a slave power supplying circuit 110, a slave current feedback circuit 111, a slave voltage feedback circuit 112, a slave current-balancing controller 113, a slave voltage difference amplifying circuit 114, and a slave comparator 115. The slave power supplying circuit 110 may be, but not limited to, a phase-shift full bridge (PSFB) circuit or an inductor-inductor-capacitor (LLC) converter. The slave power supplying circuit 110 is coupled to the load 2. The slave current feedback circuit 111 is coupled to the load 2 and the slave power supplying circuit 110. The slave voltage feedback circuit 112 is coupled to the slave power supplying circuit 110 and the load 2. The slave current-balancing controller 113 is coupled to the slave current feedback circuit 111 and the master power supply 103 of the master power supply 10. The slave voltage difference amplifying circuit 114 is coupled to the slave current feedback circuit 111 and the slave current-balancing controller 113. The slave comparator 115 is coupled to the slave voltage difference amplifying circuit 114, the slave voltage feedback circuit 112, and the slave power supplying circuit 110. The slave power supplying circuit 110 receives a slave driving voltage VR2 and generates the slave output current IO2 and the slave output voltage VO2 based on the slave driving voltage VR2. The slave current feedback circuit 111 retrieves the slave output current IO2 and generates the slave feedback current IF2 and a slave analog current IA2 based on the slave output current IO2. The slave voltage feedback circuit 112 retrieves the slave output voltage VO2 and generates a slave feedback voltage VF2 based on the slave output voltage VO2. The slave current-balancing controller 113 receives the master feedback current IF and the slave feedback current IF2, adds the master feedback current IF1 to the slave feedback current IF2 to generate the control current, and generates a slave digital setting voltage VD2 based on the control current. The slave voltage difference amplifying circuit 114 receives the slave analog current IA2 and the slave digital setting voltage VD2 and generates a slave analog reference voltage VA2 based on the slave analog current IA2 and the slave digital setting voltage VD2. The slave digital setting voltage VD2 has resolution-related limitations, and the slave analog current IA2 can be used to overcome these limitations, so that the slave analog reference voltage VA2 does not have resolution-related limitations. The slave comparator 115 receives the slave analog reference voltage VA2 and the slave feedback voltage VF2 and generates the slave driving voltage VR2 based on the slave analog reference voltage VA2 and the slave feedback voltage VF2.

Figure 4:
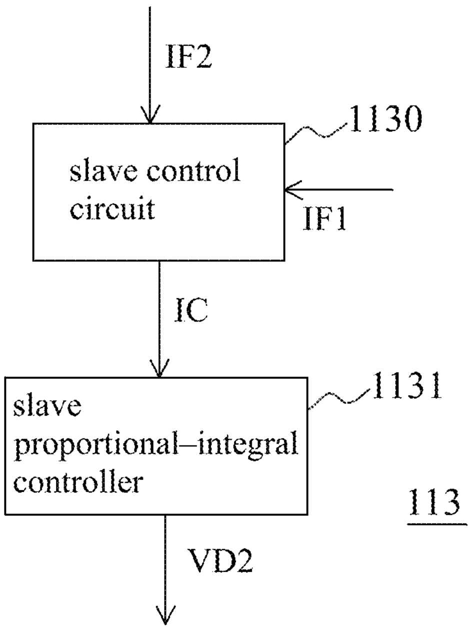
FIG. 4 is a diagram schematically illustrating a slave current-balancing controller according to an embodiment of the present invention.
Figure 5:
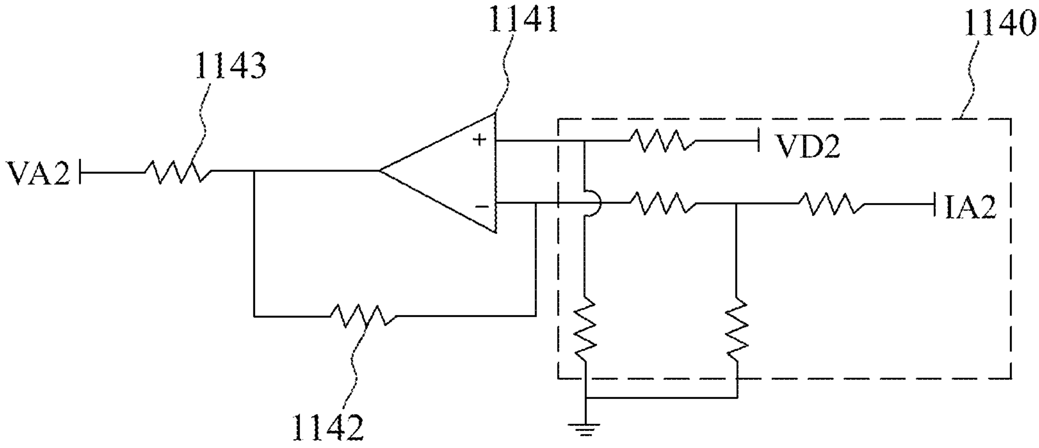
FIG. 5 is a diagram schematically illustrating a slave voltage difference amplifying circuit according to an embodiment of the present invention.

FIG. 4 is a diagram schematically illustrating a slave current-balancing controller according to an embodiment of the present invention. Refer to FIG. 1, FIG. 2, and FIG. 4. The slave current-balancing controller 113 may include, but is not limited to, a slave control circuit 1130 and a slave proportional-integral controller 1131. The slave control circuit 1130 is coupled to the slave current feedback circuit 111 and the master control circuit 1030 of the master power supply 10. The slave proportional-integral controller 1131 is coupled to the slave control circuit 1130 and the slave voltage difference amplifying circuit 114. The slave control circuit 1130 receives the master feedback current IF1 and the slave feedback current IF2 and adds the master feedback current IF1 to the slave feedback current IF2 to generate the control current IC. The slave proportional-integral controller 1131 receives the control current IC and generates the slave digital setting voltage VD2 based on the control current IC. FIG. 5 is a diagram schematically illustrating a slave voltage difference amplifying circuit according to an embodiment of the present invention. Please refer to FIG. 1, FIG. 4, and FIG. 5. The slave voltage difference amplifying circuit 114 may include, but is not limited to, a slave voltage-dividing circuit 1140, a slave operational amplifier 1141, a slave feedback resistor 1142, and a slave output resistor 1143. The slave voltage-dividing circuit 1140 is coupled to the slave current feedback circuit 111 and the slave proportional-integral controller 1131. The positive input and the negative input of the slave operational amplifier 1141 is coupled to the slave voltage-dividing circuit 1140. The slave feedback resistor 1142 is coupled between the negative input and the output of the slave operational amplifier 1141. The slave output resistor 1143 is coupled between the output of the slave operational amplifier 1141 and the slave comparator 115. The slave operational amplifier 1141 receives the slave analog current IA2 and the slave digital setting voltage VD2 through the slave voltage-dividing circuit 1140 and generates the slave analog reference voltage VA2 through the slave output resistor 1143 based on the slave analog current IA2 and the slave digital setting voltage VD2.

According to the embodiments provided above, the current-balancing power supplying device uses the analog current to overcome the problem with limited resolution and improve response speed to achieve balancing current and stable output.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A current-balancing power supplying device, coupled to a load, comprising:

a master power supply coupled to the load and configured to provide a master output current for the load, retrieve the master output current, and generate a master feedback current based on the master output current; and a slave power supply coupled to the master power supply and the load and configured to receive the master feedback current, provide a slave output current equal to the master output current for the load based on the master feedback current, retrieve the slave output current, generate a slave feedback current and a slave analog current based on the slave output current, add the master feedback current to the slave feedback current to generate a control current, and stabilize the slave output current based on the control current and the slave analog current;

wherein the master power supply is configured to provide a master output voltage corresponding to the master output current for the load and the slave power supply is configured to provide a slave output voltage equal to the master output voltage for the load based on the master feedback current;

wherein the master power supply includes:

a master power supplying circuit coupled to the load and configured to receive a master driving voltage and generate the master output current and the master output voltage based on the master driving voltage;

a master current feedback circuit coupled to the load and the master power supplying circuit and configured to retrieve the master output current and generate the master feedback current and a master analog current based on the master output current:

a master voltage feedback circuit coupled to the master power supplying circuit and the load and configured to retrieve the master output voltage and generate a master feedback voltage based on the master output voltage;

a master current-balancing controller coupled to the master current feedback circuit and the slave power supply and configured to receive the master feedback current, generate a master digital setting voltage based on the master feedback current, and output the master feedback current;

a master voltage difference amplifying circuit coupled to the master current feedback circuit and the master current-balancing controller and configured to receive the master analog current and the master digital setting voltage and generate a master analog reference voltage based on the master analog current and the master digital setting voltage; and a master comparator coupled to the master voltage difference amplifying circuit, the master voltage feedback circuit, and the master power supplying circuit and configured to receive the master analog reference voltage and the master feedback voltage and generate the master driving voltage based on the master analog reference voltage and the master feedback voltage.

2. The current-balancing power supplying device according to claim 1, wherein the master power supplying circuit is a phase-shift full bridge (PSFB) circuit or an inductor-inductor-capacitor (LLC) converter.

3. The current-balancing power supplying device according to claim 1, wherein the master current-balancing controller includes:

a master control circuit coupled to the master current feedback circuit and the slave power supply and configured to transmit the master feedback current to the slave power supply; and a master proportional-integral controller coupled to the master control circuit and the master voltage difference amplifying circuit and configured to receive the master feedback current through the master control circuit and generate the master digital setting voltage based on the master feedback current.

4. The current-balancing power supplying device according to claim 3, wherein the master voltage difference amplifying circuit includes:

a master voltage-dividing circuit coupled to the master current feedback circuit and the master proportional-integral controller;

a master operational amplifier with a positive input and a negative input coupled to the master voltage-dividing circuit;

a master feedback resistor coupled between the negative input and an output of the master operational amplifier; and a master output resistor coupled between the output of the master operational amplifier and the master comparator, wherein the master operational amplifier is configured to receive the master analog current and the master digital setting voltage through the master voltage-dividing circuit and generate the master analog reference voltage through the master output resistor based on the master analog current and the master digital setting voltage.

5. The current-balancing power supplying device according to claim 1, wherein the slave power supply includes:

a slave power supplying circuit coupled to the load and configured to receive a slave driving voltage and generate the slave output current and the slave output voltage based on the slave driving voltage;

a slave current feedback circuit coupled to the load and the slave power supplying circuit and configured to retrieve the slave output current and generate the slave feedback current and a slave analog current based on the slave output current;

a slave voltage feedback circuit coupled to the slave power supplying circuit and the load and configured to retrieve the slave output voltage and generate a slave feedback voltage based on the slave output voltage;

a slave current-balancing controller coupled to the slave current feedback circuit and the master power supply and configured to receive the master feedback current and the slave feedback current, add the master feedback current to the slave feedback current to generate the control current, and generate a slave digital setting voltage based on the control current;

a slave voltage difference amplifying circuit coupled to the slave current feedback circuit and the slave current-balancing controller and configured to receive the slave analog current and the slave digital setting voltage and generate a slave analog reference voltage based on the slave analog current and the slave digital setting voltage; and a slave comparator coupled to the slave voltage difference amplifying circuit, the slave voltage feedback circuit, and the slave power supplying circuit and configured to receive the slave analog reference voltage and the slave feedback voltage and generate the slave driving voltage based on the slave analog reference voltage and the slave feedback voltage.

6. The current-balancing power supplying device according to claim 5, wherein the slave power supplying circuit is a phase-shift full bridge (PSFB) circuit or an inductor-inductor-capacitor (LLC) converter.

7. The current-balancing power supplying device according to claim 5, wherein the slave current-balancing controller includes:

a slave control circuit coupled to the slave current feedback circuit and the master power supply and configured to receive the master feedback current and the slave feedback current and add the master feedback current to the slave feedback current to generate the control current; and a slave proportional-integral controller coupled to the slave control circuit and the slave voltage difference amplifying circuit and configured to receive the control current and generate the slave digital setting voltage based on the control current.

8. The current-balancing power supplying device according to claim 7, wherein the slave voltage difference amplifying circuit includes:

a slave voltage-dividing circuit coupled to the slave current feedback circuit and the slave proportional-integral controller;

a slave operational amplifier with a positive input and a negative input coupled to the slave voltage-dividing circuit;

a slave feedback resistor coupled between the negative input and an output of the slave operational amplifier; and a slave output resistor coupled between the output of the slave operational amplifier and the slave comparator, wherein the slave operational amplifier is configured to receive the slave analog current and the slave digital setting voltage through the slave voltage-dividing circuit and generate the slave analog reference voltage through the slave output resistor based on the slave analog current and the slave digital setting voltage.

* * * * *